J. M. FOY.
VEHICLE.
APPLICATION FILED JAN. 12, 1910.
992,183.
Patented May 16, 1911
3 SHEETS—SHEET 1.
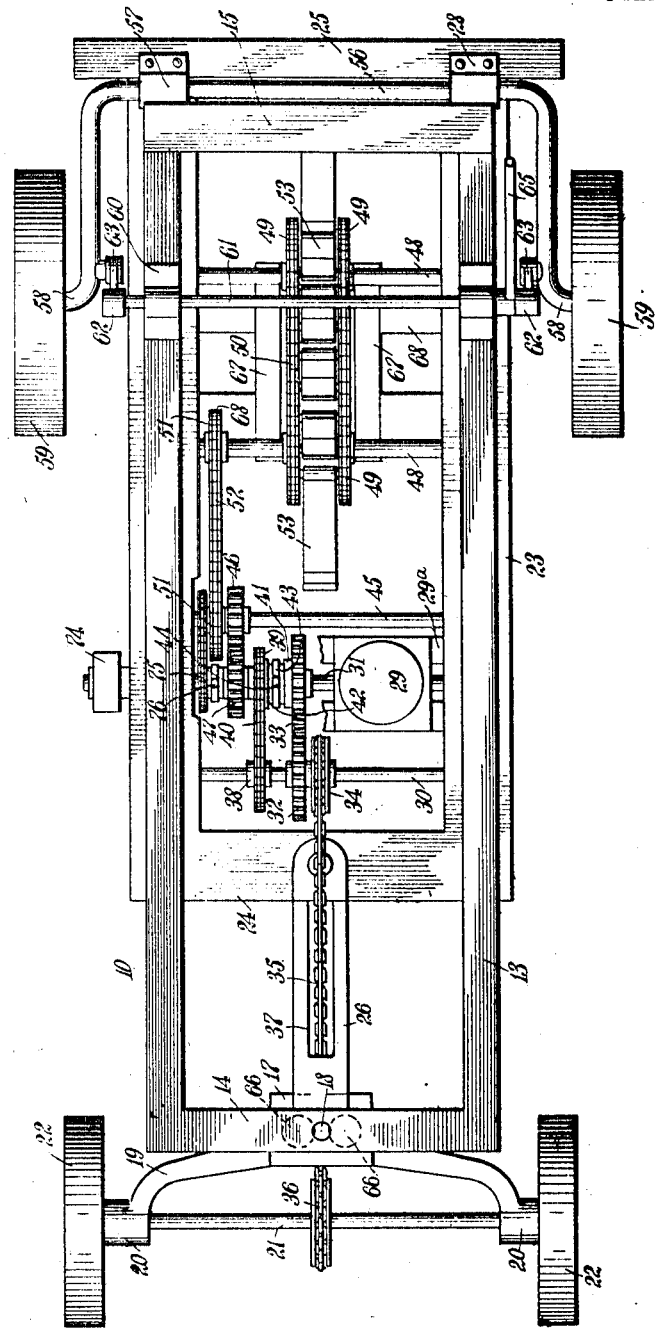
WITNESSES:
INVENTOR
James M. Foy
BY
ATTORNEYS

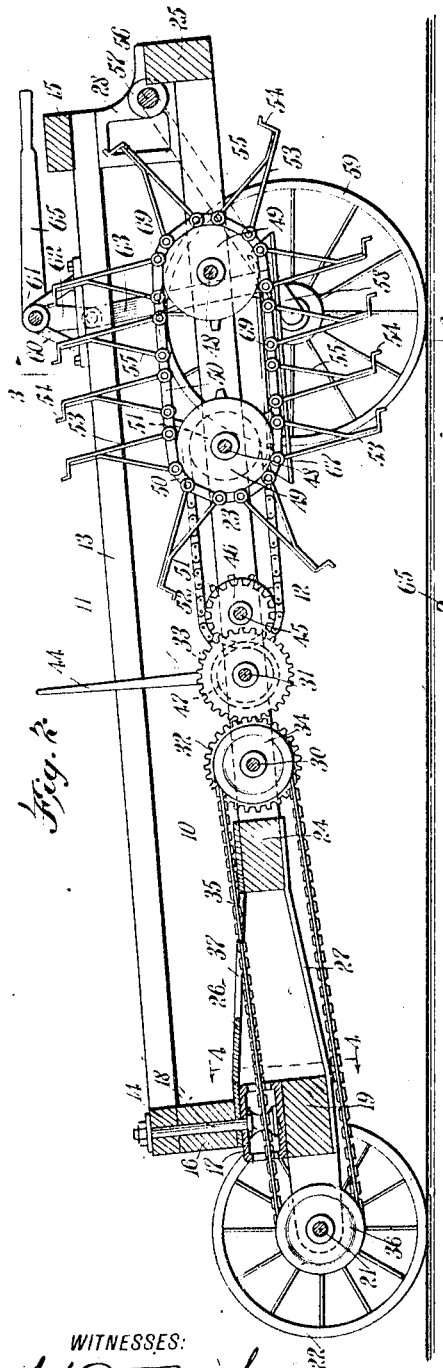
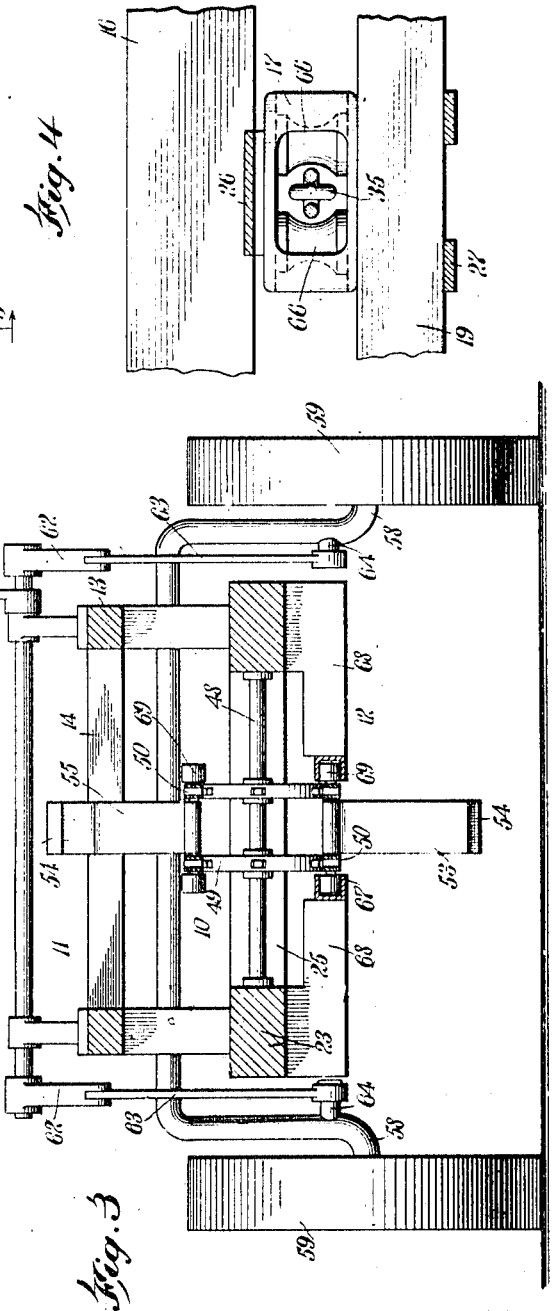

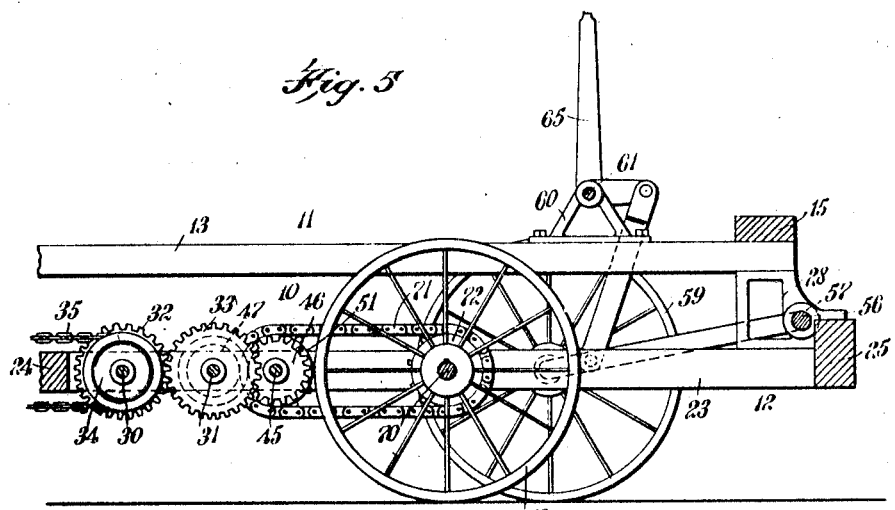
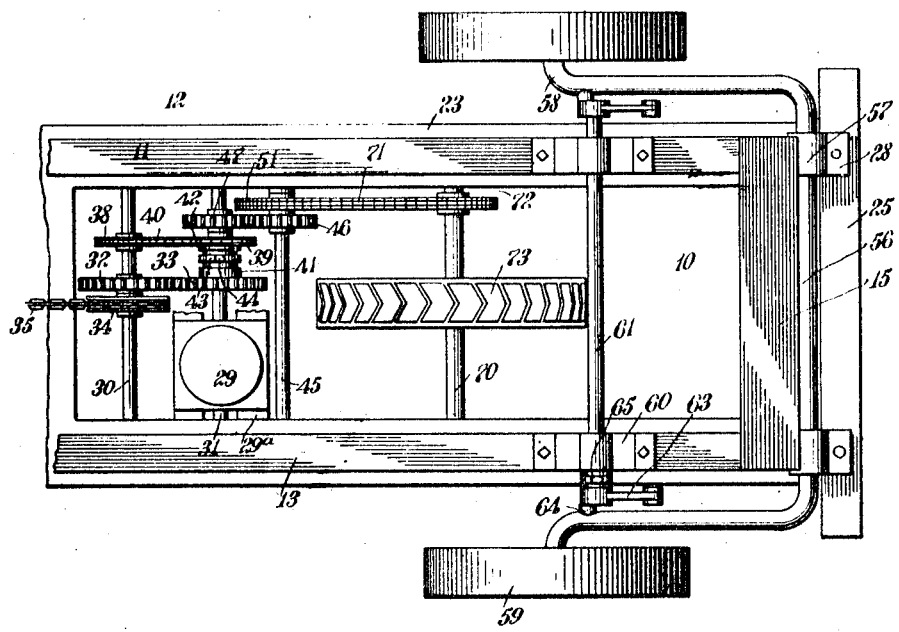

UNITED STATES PATENT OFFICE.

JAMES MORRIS FOY, OF PALATKA, FLORIDA.

VEHICLE.

992,183.  Specification of Letters Patent.  Patented May 16, 1911.

Application filed January 12, 1910. Serial No. 537,608.

*To all w m it may concern:*

Be it known that I, JAMES M. FOY, a citizen of the United States, and a resident of Palatka, in the county of Putnam and State of Florida, have invented a new and Improved Vehicle, of which the following is a full, clear, and exact description.

This invention relates to vehicles for use with agricultural implements, and for other purposes, and has reference more particularly to an automobile vehicle comprising a wheeled frame, means for driving certain of the wheels of the frame to propel the vehicle, and means operable independently of the driving wheels, to propel the vehicle.

An object of the invention is to provide a simple, strong and durable self-propelled vehicle, which can be used in connection with agricultural implements such as binders, reapers and the like, for propelling them, and which also can be employed as an automobile vehicle for other urposes.

A further object of th invention is to provide a device of the class described which has driving wheels actuated by a motor of suitable form, which has means independent of the driving wheels, for propelling the vehicle, and likewise actuated by the motor, which can be easily controlled, which is well adapted for traveling on rough ground, and upon heavy surfaces due for example, to sandy or muddy roads or fields, and which can travel up comparatively steep grades without difficulty.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of an embodiment of my invention; Fig. 2 is a longitudinal section of the vehicle; Fig. 3 is an enlarged, transverse section on the line 3—3 of Fig. 2; Fig. 4 is a similar view on the line 4—4 of Fig. 2; Fig. 5 is a longitudinal section of part of the vehicle showing a detail of modified form; and Fig. 6 is a plan view of the part of the vehicle showing the detail of modified form.

Before proceeding to a more detailed explanation of my invention, it should be clearly understood that while the vehicle is particularly useful in connection with different kinds of agricultural machinery, it can also be advantageously employed as a traction engine, or as an automobile or self-propelled vehicle, for other purposes. I provide means actuated by a suitable internal combustion motor or other prime mover, for driving certain of the supporting wheels of the vehicle, to propel it in the usual manner. In addition, I provide means adapted to be rendered operative or inoperative at the will of the driver of the machine, for actuating the vehicle independently of the driving wheels, so that the last-mentioned means serve as an auxiliary propelling device for use on heavy grades, or in emergencies due to other causes.

Certain of the details of construction form no part of my invention, and can be varied in accordance with individual preference and special conditions, without departing from the underlying spirit of the invention.

Referring more particularly to the drawings, I have shown for example, a form of my invention having a frame 10, comprising an upper frame part 11 and a lower frame part 12. The upper or main part of the frame comprises substantially parallel, spaced longitudinal members 13 connected at the front and rear ends by transverse members 14 and 15 respectively. The bolster 16 is fastened under the member 14 and has movably secured thereto by means of a king pin bracket 17 and a king pin 18, the front axle member 19, which is of U form, and at the ends has bearings 20. In the latter is journaled the front axle 21 having the front wheels 22. The latter may be of any suitable form and have preferably wide tires.

The lower frame part 12, comprises spaced, parallel, longitudinal members 23 connected at the forward and rear ends respectively, by transverse members 24 and 25. Reach members 26 and 27 extend from the upper and lower sides of the transverse member 24 to the under side of the front axle member 19, and to the top of the bracket 17, as is shown most clearly in Fig. 2, being secured in position in any suitable manner. The extremity of the member 26 has an opening through which the king pin 18 extends. Connecting pieces 28 are positioned between the frame parts 11 and 12, at the rear ends of the longitudinal frame members 13 and 23, as is shown most clearly in Fig. 2.

A prime mover 29, of any suitable form, is mounted upon the carriers 29ᵃ, of the frame part 12, and has a transverse, main driving shaft 31 journaled in suitable bearings, carried by the longitudinal frame members 23. A second shaft 30 is journaled in bearings of the frame members 23, forward of the shaft 31, and has a gear 32 in mesh with a gear 33 on the shaft 31. The shaft 30, also, has a sprocket 34, operatively connected by means of a chain 35, with a driven sprocket 36 rigid with the front axle 21. The upper run of the chain passes through a slot or opening 37 of the upper reach member 26. The shafts 30 and 31 have sprockets 38 and 39 respectively, operatively connected by a chain 40. The gear wheel 33 and the sprocket 39 are loose upon the shaft 31 and have respectively, clutch sections 41 and 42, adapted to be operatively engaged by a common clutch member 43, slidable upon the shaft 31, and constrained to rotate therewith. The clutch member 43 is controlled by a suitable, manually operable lever 44, so that it can be brought into operative engagement with either the section 41 or the section 42, to connect, respectively, the gear or the sprocket, operatively with the shaft 31.

A countershaft 45 is journaled in bearings of the frame member 23 and has a rigid gear 46 in mesh with a gear 47 carried by the shaft 31. Similar shafts 48, spaced a suitable distance apart, are journaled in bearings of the frame members 23, and each carries a pair of sprockets 49 operatively connected by chains 50. One of the shafts 48, and the shaft 45, have sprockets 51 operatively connected by a chain 52. The chains 50 have secured to links thereof, feet 53 consisting of elongated members having at the ends, laterally disposed toes 54, and associated therewith, inclined bracing members 55. The members 53 and the bracing members 55 are secured at the opposite ends of links of the chains 50, as shown most clearly in Fig. 2.

The rear axle 56 is journaled in bearings 57 of the connecting pieces 28, and has at the ends, laterally disposed parts provided at the extremities with offset axle spindles 58 upon which the rear supporting wheels 59 are journaled. The upper frame members 13 have bearing brackets 60 in which is journaled a shaft 61 having at the ends arms 62 operatively connected by means of links 63, with extensions 64 projecting inwardly from the laterally disposed parts of the rear axle 56. A lever 65 rigidly secured to the shaft 61, permits its manual operation, so that the frame of the vehicle can be raised or lowered at the rear, by means of the axle having the rear wheels.

The king pin bracket 17 consists of a substantially rectangular, hollow structure having the top and bottom spaced a suitable distance apart, to permit the upper run of the chain 35 to pass through it. Within the bracket are journaled grooved rollers 66 between which the chain 35 passes, to guide it. The king bolt is arranged perpendicularly above the rollers 66, so that the front wheels can be turned laterally, without interfering with the driving of the front axle by the chain 35. It will be understood that when the axle is turned in one direction, the upper run of the chain bends correspondingly, and passes guidingly around the roller 66, at the side toward which the vehicle is turning. The effective length of the chain is not altered by the turning of the front wheel, as the center of turning coincides substantially with the point of flexure of the chain.

By shifting the clutch member 43, so that the gear 33 is operatively connected with the shaft 31, the shaft 30 is driven by the gear, and in turn drives the front or driving axle 21, to propel the vehicle in one direction. By shifting the clutch member 43 to disengage the gear 33, and to connect the sprocket 39 operatively with the shaft 31, the direction of movement of the vehicle can be reversed. If it is desired to render the auxiliary propelling mechanism operative, the frame is lowered at the rear, by means of the lever 65, until the feet come into contact with the ground, and as they travel rearwardly with the lower runs of the chains 50 they will tend to move the vehicle forward. By actually engaging the ground with the feet, the vehicle can be driven very powerfully in heavy going, and up steep grades. The adjustment of the frame should be such that sufficient of the weight of the vehicle rests upon the feet to cause them to engage the ground firmly, though the major part of the weight is supported upon the rear wheels 59. To facilitate the movement of the chains 50 I provide suitable, spaced guide channels 67 mounted upon inwardly extending supports 68, carried by the lower frame members 23. The guide channels receive guide rollers 69 of the chains which pass through them, and serve to regulate the travel of the chains and hold the feet while these are in operative engagement with the ground.

In Figs. 5 and 6 is shown a modified form of my invention, in which the shafts 48 and 49 are dispensed with and are replaced by a single shaft 70, which corresponds to the forward shaft 48, and which is operatively connected with the countershaft 45, by means of a chain 71 passing around the sprocket 51 of the shaft 45 and a sprocket 72 of the shaft 70. The latter has a fifth wheel 73 constituting a driving wheel, and of any suitable form, mounted thereon, and designed for the same function as the feet 53, that is, to act as an auxiliary propelling mechanism for the vehicle.

The driving shaft of the prime mover preferably has a pulley 74 by means of which it can be operatively connected with mechanism which it is desired to drive. In this way the vehicle can serve as a power producer, if desired, for various purposes. It will be understood that when the prime mover is being used in this manner, that the clutch member is in a neutral position, and consequently the driving wheels are inoperative.

In addition to the gears 46 and 47 connecting the shafts 31 and 45, I prefer also to employ chain and sprocket gearing 75, which permits the auxiliary propelling mechanism to be reversed, a clutch device 76, similar to the device 43, being provided for the purpose. It will be understood that the sprocket of the gear 75 is loose upon the shaft 31, as is the sprocket 47, each being provided with a clutch section adapted to coöperate with the part 76.

Having thus described my invention, I claim as new, and desire to secure by Letters Patent:

1. A vehicle, comprising a frame, wheels for supporting said frame, a prime mover carried by said frame, means for operatively connecting said prime mover and certain of said wheels, to propel the vehicle in a plurality of directions, and an auxiliary propelling device independent of said wheels, and operatively connected with said prime mover, said frame having means whereby it can be raised and lowered to render said auxiliary propelling device inoperative and operative.

2. A vehicle, comprising a wheeled frame, said frame being adjustably carried by said wheels, means for raising and lowering said frame, and a propelling device carried by said frame, and adapted to be rendered operative and inoperative by the lowering and raising of said frame.

3. A vehicle, comprising a frame, driving wheels for said frame, a prime mover carried by said frame, means for operatively connecting said wheels and said prime mover, other wheels for supporting said frame, means for connecting said other wheels and said frame, whereby said frame can be raised and lowered, an auxiliary propelling device carried by said frame, and means for operatively connecting said prime mover and said auxiliary propelling device, said means operatively connecting said prime mover and said driving wheels permitting the operation of said wheels in opposite directions.

4. A vehicle, comprising a frame, a prime mover carried thereby, a pivoted axle member secured to said frame, wheels journaled upon said axle member, means for operatively connecting said wheels and said prime mover, an axle pivotally connected with said frame and having offset axle spindles, wheels journaled upon said axle spindles, means for adjusting said axle to raise and lower said frame, and an auxiliary propelling device carried by said frame and operatively connected with said prime mover.

5. A vehicle, comprising a frame, an axle having wheels and pivotally secured to said frame, said axle being adjustable to steer the vehicle, a prime mover carried by said frame, means for operatively connecting said prime mover and said axle, a second axle journaled upon said frame and having offset axle spindles, wheels mounted upon said spindles, means for operating said second axle, to raise and lower said frame, an auxiliary propelling device, and means for operatively connecting said auxiliary propelling device and said prime mover, said auxiliary propelling device being adapted to be rendered operative and inoperative by the lowering and raising of said frame.

6. In a vehicle, a frame, a prime mover carried thereby, an axle journaled upon said frame and having off-set axle spindles, wheels mounted upon said spindles, a shaft having a rigid arm, a link connecting said arm and said axle, means for manually operating said shaft to raise and lower said frame by the adjustment of said axle, an endless member arranged to travel upon said frame, means for operatively connecting said endless member and said prime mover, and feet carried by said endless member and adapted to engage the ground when said frame is lowered to propel the vehicle.

7. A vehicle, comprising a frame, supporting wheels for said frame, a prime mover carried by said frame, shafts journaled upon said frame, sprockets carried by said shafts, chains arranged to travel around said sprockets, feet carried by said chains and adapted to engage the ground to propel the vehicle, means for operatively connecting one of said shafts and said prime mover, means for raising and lowering said frame, certain of said supporting wheels having a pivotal axle, a further shaft journaled upon said frame, means for operatively connecting said axle and said further shaft, said means permitting the pivotal movement of said axle, and means for operatively connecting said further shaft and said prime mover, whereby said further shaft can be driven in opposite directions.

In testimony whereof I have signed my name to this specification in the presence of two subscribing witnesses.

JAMES MORRIS FOY.

Witnesses:
T. B. MERRILL,
JAS. A. BAIN.